July 14, 1959   H. J. IRTHUM ET AL   2,894,635
SEALING MEANS FOR ROTARY DRUM FILTERS
Filed July 23, 1956   3 Sheets-Sheet 1

INVENTORS
Harold J. Irthum
Frederick L. Schorken
BY
Theodore M. Jablon
ATTORNEY

July 14, 1959  H. J. IRTHUM ET AL  2,894,635
SEALING MEANS FOR ROTARY DRUM FILTERS
Filed July 23, 1956  3 Sheets-Sheet 2

INVENTORS
Harold J. Irthum
Frederick L. Schorken
BY Theodore M. Jablon
ATTORNEY

July 14, 1959   H. J. IRTHUM ET AL   2,894,635
SEALING MEANS FOR ROTARY DRUM FILTERS
Filed July 23, 1956   3 Sheets-Sheet 3

INVENTORS
Harold J. Irthum
Frederick L. Schorken
BY Theodore M. Jablon
ATTORNEY 2,894,635
Patented July 14, 1959

2,894,635

SEALING MEANS FOR ROTARY DRUM FILTERS

Harold J. Irthum, San Leandro, and Frederick L. Schorken, Alameda, Calif., assignors to Dorr-Oliver Incorporated, Stamford, Conn., a corporation of Delaware Application July 23, 1956, Serial No. 599,480

1 Claim. (Cl. 210—402)

This invention relates to external rotary drum filters in which the filter drum such as a perforated cylinder rotates in a vat to which there is supplied a continuous feed of pulp to be dewatered while filtrate continuously passes from the interior of the drum to a locality of discharge outside the vat.

More in particular, this invention relates to improvements in a type of filter known as a "Decker," so-called after its early inventor, which is a type of filter that has found application more particularly in the field of dewatering such freely filtering fibrous pulps, as for example, paper pulp that is to be dewatered in preparation to supplying it to the paper-making machines.

The object of this invention is to improve certain peripheral drum sealing means which are provided in and are a characteristic part of Decker type filters, such sealing means being effective peripherally between the open end of the filter drum and the adjacent vertical end wall of the vat, in order that filtrate may be discharged from the interior of the drum at a low point thereof, that is, a point relatively close to the bottom of the vat, or else close to the lowermost peripheral point of the drum. This arrangement utilizes the hydrostatic head between the pulp level in the vat and the filtrate level within the drum, to effect the passage of liquid from the pulp gravitationally into the filter drum along a submerged portion thereof.

That is to say, in the operation of such a Decker type pulp dewatering rotary drum filter there is maintained a high pulp level in the vat and a low liquid level of filtrate inside the drum, while a filter cake or mat is formed continuously upon the drum incident to the continuous rotation thereof. In this operation, the major portion of the drum periphery is immersed in the pulp, while the filter cake emerging from the vat of pulp is continuously removed from the non-immersed top portion of the drum continuously during the rotation thereof.

Usually, one end of the filter drum is closed whereas the other end is open even though peripherally sealed against the adjacent end wall of the vat by means of the abovementioned peripheral sealing means which extend along the submerged portion of the periphery to prevent liquid or pulp from the vat entering the drum interior through its open end, yet which allow for the provision of the aforementioned filtrate discharge from the low point of the drum interior and through the adjacent end wall of the vat.

The filtrate discharge end of the vat, that is to say, a filtrate discharge connection in this end wall of the vat is disposed at a relatively low point of the vat near the bottom thereof, yet within the area defined by the peripherally extending seal effective between the stationary end wall of the vat and the adjacent open end portion of the filter drum.

As above indicated, this invention is specifically concerned with improving the peripherally extending sealing means effective between the open discharge end of the filter drum and the adjacent vertical end wall of the vat.

Heretofore, such a peripheral seal was in the nature of the so-called "deckle strap," which is a strap sealingly surrounding both a stationary ring extending inwardly from the end wall of the vat and another corresponding similar ring which is part of the rotating drum and concentric therewith as well as concentric with the ring that is unitary with the vat. Such a deckle strap being wrapped around the stationary and the rotating ring portions must be held in sealing contact therewith by means of spring tension applied to the upward free ends of the strap, emerging upwardly from the body of pulp in the vat. Such a deckle strap was to prevent liquid of pulp from the vat from entering the interior of the filter drum at the filtrate discharge end thereof during the rotation of the drum.

This older deckle strap type peripheral seal arrangement was subject to considerable wear and tear as well as to a degree of leakage occasioned, for example, by some inaccuracy of concentricity between the stationary and the rotating rings, and by pulp particles liable to enter between the contacting sealing surfaces of the strap and their associated sealing rings.

This invention has for its object to provide improved peripheral sealing means in a filter unit of the general type above outlined, whereby potential leakage as well as wear and tear due to the aforementioned causes are greatly reduced and eliminated, so that shutdowns, overhauls and interruptions of the filter operations are significantly reduced and minimized.

To attain this object, the present invention provides a peripherally extending channel construction extending in a vertical plane and unitary as well as rigid with the end wall of the vat, at the filtrate effluent thereof. This channel construction faces inwardly to extend along and adjacent to the periphery of the open end of the filter drum, the open end of the drum in turn being formed along its periphery with an annular bearing surface extending in the vertical plane transversely of the axis of rotation of the drum. As a sealing element proper there is provided a tube element of inflatable distendable material, for example, rubber tube, which is placed in and confined by the aforementioned channel construction. The disposition of this tubular sealing element is such that both terminal portions thereof extend each upwardly to a point above the pulp level in the vat, the one end being closed, the other end being connected to water pressure such that thereby the tube element is maintained properly distended and thus in operational sealing contact with the vertical annular sealing surface provided at the filtrate discharge end of the drum.

Furthermore, pinholes or weepholes are provided in the tube along the sealing face thereof to allow for a continuous escape therethrough of a relatively small flow of pressure water to effect purging of the sealing surfaces as a continuous protection against the entry of particles from the pulp supply in the vat. In other words, this purging liquid is effective to prevent the entry of pulp particles that otherwise might penetrate in between the sealing surfaces due to the hydrostatic pulp in the vat.

According to a more specific feature, the distendable tubular sealing element has an especially reinforced contact wearing portion formed with at least one longitudinal groove, that is a groove co-extensive with the tube axis and defined by a pair of corresponding longitudinal lands running parallel to one another. The aforementioned pinholes or weepholes empty into this groove between the lands, thereby distributing the purging water practically instantaneously along the effective peripheral length of the seal.

In this way, the purging water effectively lubricates the sealing surfaces or interface between the stationary or the rotary element of the sealing means, even while continuously purging the sealing faces of particles or fibers from the pulp contents in the vat.

Figure 1:
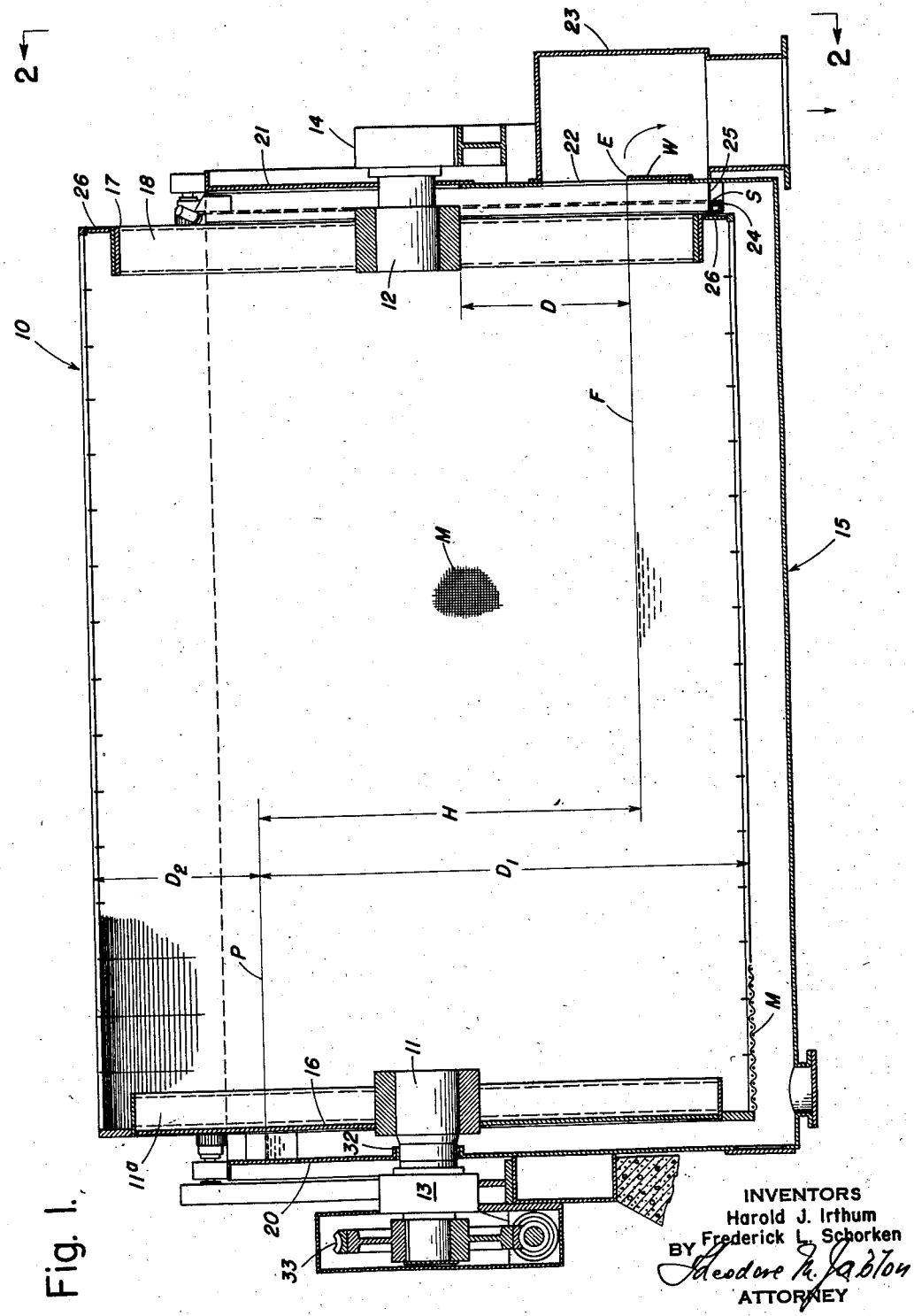
Figure 1 is a longitudinal sectional view of the filter unit, having the hydrostatic operating head as well as the flow of filtrate indicated therein, and also showing diagrammatically the arrangement of the improved sealing means at the filtrate discharge end of the filter unit.

The filter unit here shown by way of example to embody this invention is provided with a pair of trunnions 11 and 12 whereby it is rotatable in respective bearings 13 and 14 supported upon the end walls of a vat 15 at the end walls thereof. This vat 15 contains the pulp in which the filter drum 10 is continuously immersed to an extent indicated by the pulp level "P" in the vat.

The filter drum 10 has a closed end or end wall 16 and an open end 17, the closed end being in the form of a vertical plate carrying rigidly connected therewith the trunnion 11 and reinforcing spider structure 11a the other trunnion 12 being fixed to the open end of the drum by means of spider structure 18.

The pulp level "P" in the vat 15 indicates the extent to which the filter drum is immersed. Thus it will be seen that a major portion of the drum is immersed to a depth "$D_1$" the non-immersed portion of the drum being designated as "$D_2$." The filtrate level within the drum is indicated as at "F" as defined by the overflow edge "E" of an adjustable filter effluent weir "W."

The vat 15 comprises a trough-like body portion 19 closed at one end by an end plate or end wall 20 and at the opposite end by an end wall 21, the latter being provided with a filtrate discharge opening 22 and with a corresponding discharge conduit leading therefrom as is indicated at 23. The filtrate discharge opening 22 has associated therewith the adjustable effluent weir "W" defining the filtrate level "F" within the drum.

Between the filtrate effluent end of the drum and the adjacent end wall 21 of the vat there is effective an improved peripheral seal arrangement which comprises a tubular flexible and distendable sealing element 24, for example a rubber tube, arranged to extend in a vertical plane between the stationary end wall 21 of the vat and the rotary peripheral portion of the drum. That is to say, the tubular sealing element 24 is held seated upon the stationary end wall 21 to sealingly engage the filtrate effluent end 17 of the drum along the submerged peripheral portion thereof. More precisely, a ring or cylindrical portion 25 of small cylindrical height substantially concentric with the drum extends inwardly from the stationary end wall 21 of the vat, which ring is formed at its free end with an inwardly open channel "C" adapted to receive and hold therein the tubular sealing member element 24. The filter drum in turn is provided at its open end with a rim or annular flange portion 26 presenting in a vertical plane a peripheral sealing face for sealing contact with the tubular sealing member 24 when the latter is properly distended as by means of an adequately high water pressure maintainable therein.

Figure 3:
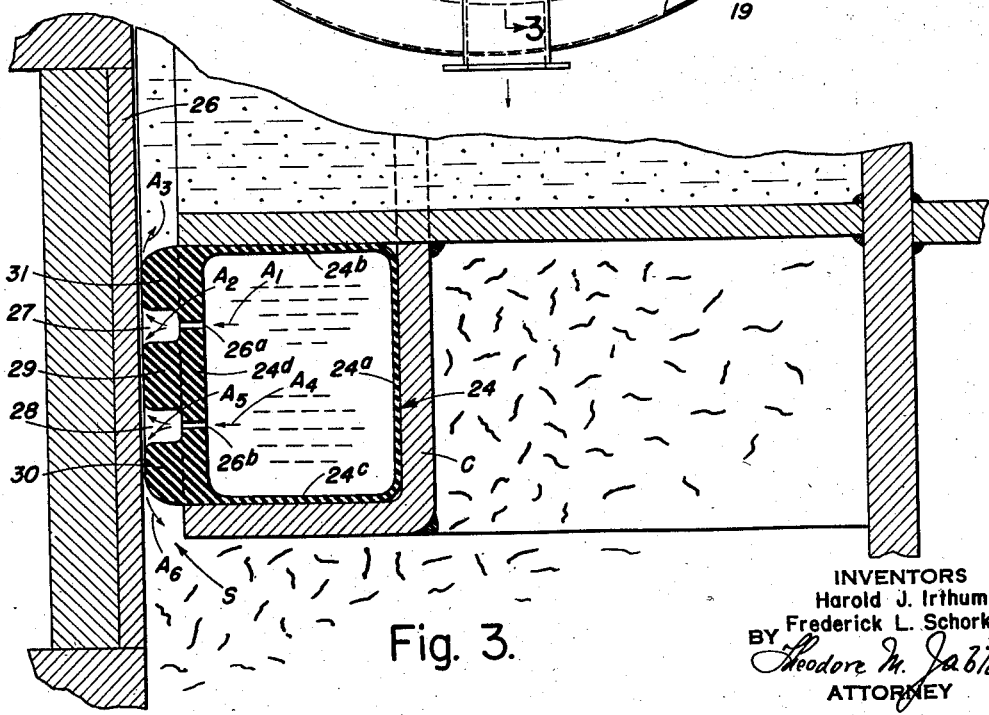
Figure 3 is a greatly enlarged detailed cross-sectional view of the seal itself, taken from Figure 1.
Figure 4:
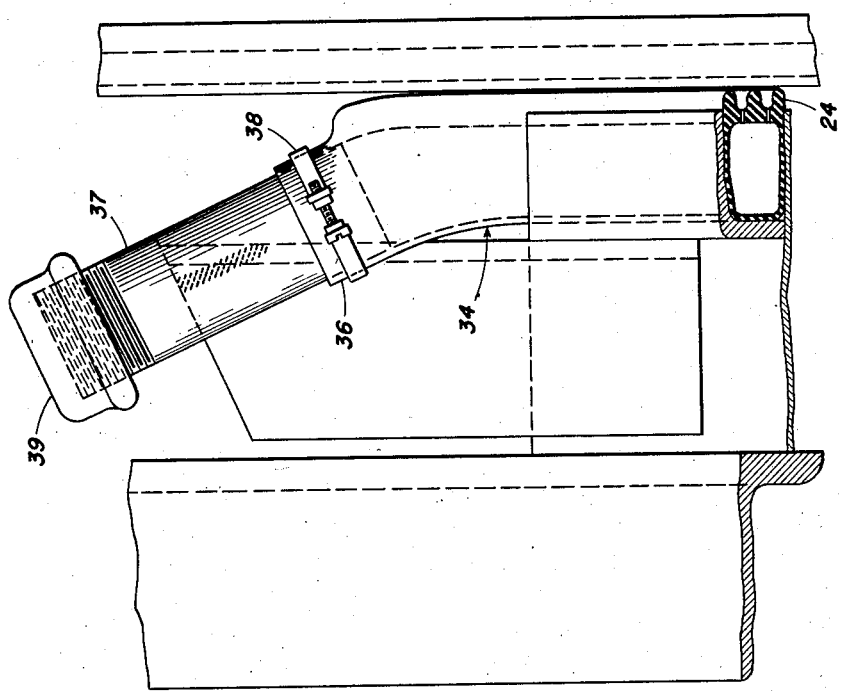
Figure 4 is a greatly enlarged detailed view of the dead end portion of the tubular distendable sealing element.
Figure 5:
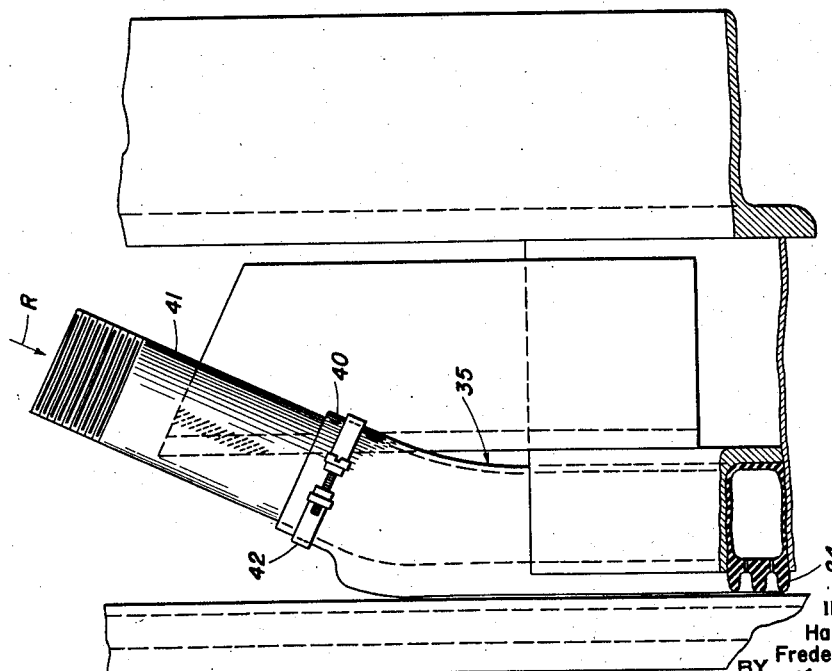
Figure 5 is a greatly enlarged detailed view, similar to Figure 4, of the pressure supply end portion of the tubular distendable sealing element.

According to this invention, the tubular sealing member 24 has certain characteristics of its cross sectional configuration as well as other features all as more clearly shown in the enlarged detail Figures 3, 4, 5. This cross-section of the tubular element 24 is of general rectangular configuration similar to the cross-section of the channel structure "C" in which it is contained. This rectangular cross-sectional configuration comprises an outwardly facing wall portion 24a, a transverse inner wall portion 24b, a transverse outer wall portion 24c and a vertical inwardly facing wall portion 24d. This latter wall portion 24d presents the sealing surface and it is especially reinforced for wear as well as shaped for sealing efficiency. This reinforced wear portion 24d is provided with at least one series of pinholes or weepholes through which a small quantity of pressure water from within the tube may escape continuously to act as a lubricating as well as purging medium between the stationary and the moving sealing faces of the peripheral seal.

More specifically, the reinforced wearing portion of the tubular sealing element is shown to be formed with a pair of grooves 27 and 28 as defined by lands 29, 30 and 31. Each of the grooves 27 and 28 has leading into it a series of pinholes 26a and 26b respectively whereby the lubricating and purging pressure water from the interior of the tube is distributed substantially instantaneously along the grooves.

Figure 2:
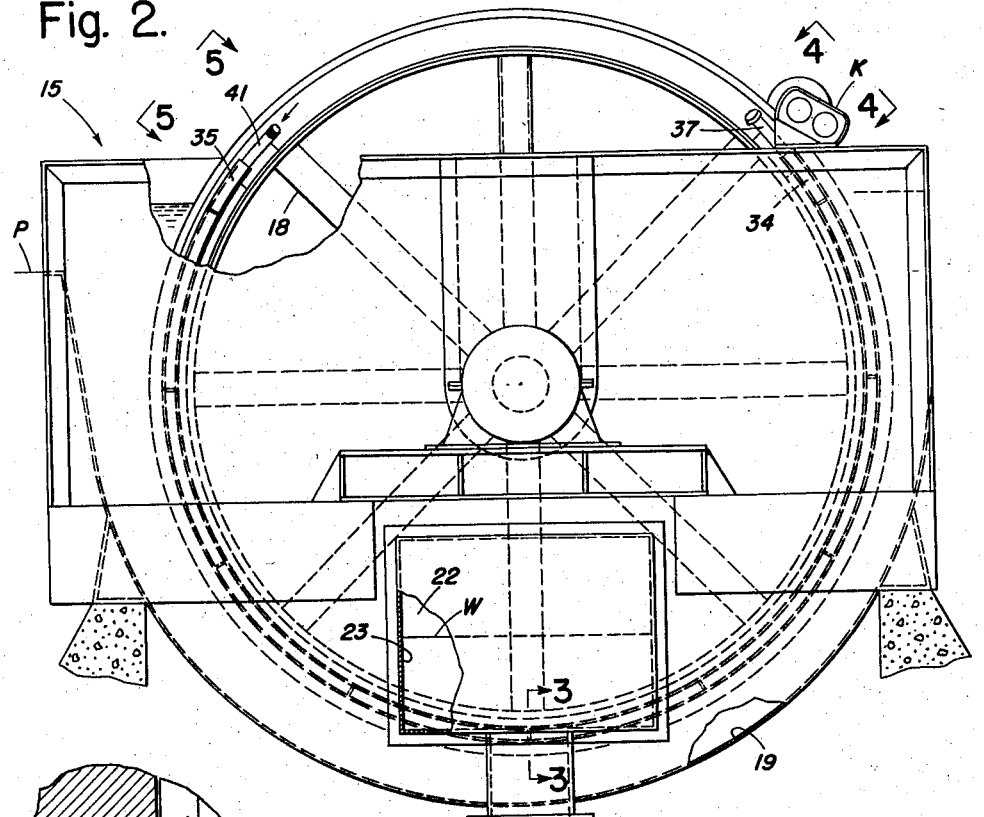
Figure 2 is an end view taken on line 2—2 of Figure 1 showing the filtrate effluent end of the filter unit.

As will be noted from Figures 1 and 2, the filtrate level "F" within the drum is maintained at all times a significant distance "D" below the trunnion 12, as well as a distance "H" below the level "P" of the feed pulp in the vat outside the drum. The differential "H" between the pulp level and the filtrate level represents the hydrostatic head under which the liquid from the feed pulp passes through the perforations or wire mesh "M" of the filter drum into the interior thereof and thence out through the open discharge end thereof, that is by way of the stationary weir "W" into the filtrate discharge conduit 23. The construction of the filter drum itself is well known and need no further detailed description. This also is true for cake stripping device "K" indicated at the non-immersed upper portion of the filter drum.

The trunnion 11 being located below the pulp level "P" extends through the end wall 20 of the vat in sealing relationship therewith, there being employed a stuffing box or its suitable equivalent such as is designated by the numeral 32 in Figure 1. Drive means for continuously rotating the filter drum are indicated by a worm drive 33 having driving connection with the trunnion 11 of the drum.

Figures 4 and 5 represent the terminal portions 34 and 35 of the tubular sealing member 24, each of the terminal portions extending to a locality above the pulp level "P" in the vat. The Figure 4 terminal portion 34 as viewed from above is formed with cylindrical neck portion 36 surrounding a short length of pipe 37 and secured thereto as by means of a hose clamp 38, a cap screw 39 being provided for tightly closing the free end of the terminal pipe 37 to constitute a dead end or closure of the tubular element 24.

The Figure 5 terminal portion 35 of the tubular element is shaped similar to the Figure 4 terminal portion 34 in that it is formed with a cylindrical neck portion 40 surrounding a short length of pipe 41 and secured thereto as by a hose clamp 42, the length of pipe 41 serving as connection for a suitable water pressure supply here indicated merely by an arrow "R."

The general operation of the filter unit is substantially self-explanatory from the foregoing description. With respect to the formation of the improved sealing means "S," it may be added that the tubular sealing element 24 should be supplied with water pressure sufficiently high to insure that it will sealingly engage the inner faces of the stationary channel structure "C"—in which it is contained. Also, due to such water pressure the tubular element should distend sufficiently to insure the effective sealing engagement between the wearing portion 24a of the tubular element, as represented by the lands 29, 30 and 31 and by the annular peripheral sealing face of the flange portion 25 of the drum.

Lubricating-and purging water escapes from the interior of the tubular element 24 by way of weepholes 26a into the distributing groove 27, such being indicated by arrows $A_1$ and $A_2$. From the groove 27 the lubricating water may spread inwardly towards and into the interior of the drum containing the filtrate liquid, as indicated by an arrow $A_3$, thus to lubricate the sealing area as defined by the inner land 31 of the tubular sealing element. Similarly, pressure water will escape by way of the weepholes 26b into the distributing groove 28, as is indicated by arrows $A_4$ and $A_5$ and then spread outward as indicated by arrow $A_6$ towards and into the body of feed pulp surrounding the drum thus to lubricate as well as purge the sealing surface which is defined by the outer land 30 on the tubular element 24. The intermediate land portion 29 thus receives the benefit water lubrication from both the grooves 27 and 28.

We claim:

In a continuous rotary drum filter having a vat adapted to be filled with pulp to be dewatered, a drum filter element rotatably mounted in said vat, and filtrate discharge passage means for removing filtrate liquid from the interior of said drum through the open end thereof and directly through the adjacent end wall of the vat, which discharge passage means comprises sealing means effective between said end wall of the vat and the adjacent open end of the filter drum along the submerged peripheral portion thereof; the combination with an improved sealing means comprising a flexible tubular sealing member disposed to extend along said submerged peripheral portion and having terminal portions extending to respective localities above the pulp level in the vat, an annular terminal flange portion for said drum adjacent said end wall, channel means adjacent said flange portion and integral with said end wall adapted to receive said tubular member, fluid pressure supply means for said tubular member to inflate said tubular member into fixed engagement with said channel means and into sealing engagement with said flange portion, weephole means in said tubular member adjacent the portion of said tubular member engaging said flange member to allow fluid to escape between said tubular member and said flange whereby said fluid provides lubrication between said tubular element and said flange, and a reinforced wearing portion for said tubular member having at least one longitudinal groove therein coextensive with the linear extent of said tubular member and defined substantially by lands coextensive with said groove.

References Cited in the file of this patent

UNITED STATES PATENTS

| | | |
|---|---|---|
| 358,749 | Pope | Mar. 1, 1887 |
| 1,619,484 | Peck | Mar. 1, 1927 |
| 1,633,121 | Minton | June 21, 1927 |
| 2,109,679 | Neveling | Mar. 1, 1938 |
| 2,725,145 | Mylius | Nov. 29, 1955 |
| 2,736,265 | Higgins | Feb. 28, 1956 |
| 2,760,791 | Neubauer et al. | Aug. 28, 1956 |

FOREIGN PATENTS

| | | |
|---|---|---|
| 23,941 | Norway | Oct. 27, 1913 |
| 208,928 | Great Britain | Jan. 3, 1924 |